(12) United States Patent
Taniguchi (10) Patent No.: US 8,928,264 B2
(45) Date of Patent: Jan. 6, 2015

(54) CONTROL DEVICE FOR ROTATING ELECTRICAL MACHINE

(71) Applicant: Denso Corporation, Kariya, Aichi-pref. (JP)

(72) Inventor: Makoto Taniguchi, Obu (JP)

(73) Assignee: Denso Corporation, Kariya (JP)

( * ) Notice: Subject to any disclaimer, the term of this patent is extended or adjusted under 35 U.S.C. 154(b) by 80 days.

(21) Appl. No.: 13/845,513

(22) Filed: Mar. 18, 2013

(65) Prior Publication Data

US 2013/0264981 A1 Oct. 10, 2013

(30) Foreign Application Priority Data

Apr. 5, 2012 (JP) ................................ 2012-086492
Apr. 5, 2012 (JP) ................................ 2012-086493

(51) Int. Cl.
H02P 27/02 (2006.01)
H02P 6/14 (2006.01)
H02P 6/08 (2006.01)

(52) U.S. Cl.
USPC ............ 318/400.26; 318/400.13; 318/400.22; 318/139

(58) Field of Classification Search
USPC .................. 318/400.13, 400.22, 400.26, 139
See application file for complete search history.

(56) References Cited

U.S. PATENT DOCUMENTS

| | | | | |
|---|---|---|---|---|
| 5,917,295 A | * | 6/1999 | Mongeau | 318/400.29 |
| 5,952,812 A | * | 9/1999 | Maeda | 318/803 |
| 7,294,984 B2 | * | 11/2007 | Urakabe et al. | 318/378 |
| 7,391,132 B2 | * | 6/2008 | Chen | 307/43 |
| 7,439,697 B2 | * | 10/2008 | Miyazaki et al. | 318/400.41 |
| 7,579,792 B2 | * | 8/2009 | Nagashima et al. | 318/105 |
| 7,612,509 B2 | * | 11/2009 | Urakabe et al. | 318/378 |
| 7,956,563 B2 | * | 6/2011 | Perisic et al. | 318/440 |
| 7,990,098 B2 | * | 8/2011 | Perisic et al. | 318/801 |
| 8,002,056 B2 | * | 8/2011 | Chakrabarti et al. | 180/65.22 |
| 8,115,433 B2 | * | 2/2012 | Welchko | 318/400.13 |
| 8,183,820 B2 | * | 5/2012 | Anwar et al. | 320/104 |
| 8,487,568 B2 | * | 7/2013 | Franke | 318/400.3 |
| 8,569,981 B2 | * | 10/2013 | Nakamura et al. | 318/400.02 |
| 2004/0228050 A1 | * | 11/2004 | Recker et al. | 361/23 |
| 2006/0108957 A1 | * | 5/2006 | Urakabe et al. | 318/139 |
| 2006/0119184 A1 | * | 6/2006 | Chen | 307/66 |
| 2007/0120520 A1 | * | 5/2007 | Miyazaki et al. | 318/801 |
| 2007/0290647 A1 | * | 12/2007 | Urakabe et al. | 318/494 |
| 2009/0032316 A1 | * | 2/2009 | Chakrabarti et al. | 180/65.1 |
| 2009/0033251 A1 | * | 2/2009 | Perisic et al. | 318/105 |
| 2009/0033253 A1 | * | 2/2009 | Nagashima et al. | 318/139 |
| 2010/0013438 A1 | * | 1/2010 | Anwar et al. | 320/138 |
| 2011/0156627 A1 | * | 6/2011 | Nakamura et al. | 318/400.22 |
| 2013/0271056 A1 | * | 10/2013 | Bunte et al. | 318/503 |
| 2014/0055059 A1 | * | 2/2014 | Uryu et al. | 318/9 |

FOREIGN PATENT DOCUMENTS

JP        A-2010-207010        9/2010

* cited by examiner

*Primary Examiner* — Paul Ip
(74) *Attorney, Agent, or Firm* — Oliff PLC (57) ABSTRACT

According to typical examples, the first stator winding having the lower rated voltage is connected to the second direct-current voltage source only when the rotation speed of the rotating electrical machine becomes high. Therefore, output in a high-rotation range can be ensured while preventing the second stator winding from reaching a heat-generation limit. Furthermore, such switching operations can be actualized by the first switch and the second switch. Therefore, a control device of a rotating electrical machine can be actualized by a relatively simple configuration.

8 Claims, 6 Drawing Sheets

CONTROL DEVICE FOR ROTATING ELECTRICAL MACHINE

CROSS-REFERENCE TO RELATED APPLICATION

This application is based on and claims the benefit of priorities from earlier Japanese Patent Application Nos. 2012-086492 and 2012-086493 filed Apr. 5, 2012 respectively, the descriptions of which are incorporated herein by reference.

BACKGROUND OF THE INVENTION

1. Field of the Invention

The present invention relates to a control device for a rotating electrical machine that controls the torque of the rotating electrical machine by operating an inverter.

2. Description of the Related Art

In recent years, brushless motors are often being used for drive motors in hybrid cars, electric cars and the like. However, unlike industrial equipment (e.g. elevators, ropeways and the like) and other electric cars (e.g. railway vehicles, trolleys and the like), automobiles provide acceleration torque for start-up from a stopped state and power for generating torque until high-speed cruising using power solely from a battery that is mounted in a limited amount of space. Therefore, extremely wide-ranging operating characteristics are required to be actualized with a compact size.

Here, to actualize the wide-ranging operating characteristics, for example, as shown in JP-A-2010-207010, a technique is proposed in which an electric motor is operated by the number of turns in a stator winding being changed as required. As described in JP-A-2010-207010, such ideas have been known since the past. However, to actualize this technique, a large number of high-capacity semiconductor switches are required, and the control device becomes complex.

Mounting becomes difficult when the technique described in JP-A-2010-207010 is used within a limited amount of space, such as within a passenger car. In fact, although practical application of the technique described in JP-A-2010-207010 is advancing in fields where the restriction on mounting space is relatively low, such as in elevators, the technique has yet to be put to practical use in automobiles.

Therefore, a control device for a rotating electrical machine capable of changing the characteristics of a stator winding with a simple configuration is desired.

SUMMARY

As one of typical examples, the present application provides a control device of a rotating electrical machine including a first stator winding and a second stator winding that has a greater rated voltage than the first stator winding, the first stator winding and the second stator winding being insulated from each other. The control device includes: a first inverter that is connected to the first stator winding; a second inverter that is connected to the second stator winding; a controller that operates the first inverter and the second inverter to control a current and voltage (i.e. torque) of the rotating electrical machine; a first switch for switching a first state and a second state, wherein the first state is a state that the first inverter and the second inverter is electrically connected to a second direct voltage source, and the second state is a state that only the second inverter is electrically connected to the second direct voltage source; and a second switch for connecting or disconnecting the first inverter to and from a first direct-current voltage source whose potential voltage is lower than that of the second direct-current voltage source. In the control device, the controller performs i) an operation to switch the first switch to an open state and switch the second switch to a closed state when a rotation speed of the rotating electrical machine is low, and ii) an operation to switch the first switch to a closed state and the second switch to an open state when the rotation speed of the rotating electrical machine becomes high (a control device of a rotating electrical machine according to a first aspect of the present invention).

In addition, as another typical example, the present application provides a control device of a rotating electrical machine including a first stator winding in which a plurality of coils are connected and a second stator winding in which a plurality of coils are connected and that has a greater rated voltage than the first stator winding. The control device includes: a first inverter that is connected to the first stator winding; a second inverter that is connected to the second stator winding; a controller that operates the first inverter and the second inverter to control torque of the rotating electrical machine; and a first switch that opens and closes between a neutral point of the first stator winding and a neutral point of the second stator winding. In the control device, the first stator winding and the second stator winding are insulated from each other and housed within the rotating electrical machine. An electrically wired connection is made either between a positive-side direct-current bus of the first inverter and a positive-side direct-current bus of the second inverter, or between a negative-side direct-current bus of the first inverter and a negative-side direct-current bus of the second inverter. The controller i) sets the first switch to an open state, applies an alternating voltage based on a voltage of a first direct-current voltage source to the first stator winding from the first inverter and applies an alternating voltage based on a voltage of a second direct-current voltage source to the second stator winding from the second inverter when a rotation speed of the rotating electrical machine is low, and ii) switches the switch to a closed state, and performs ON and OFF operation of a first switching element group connected to said electrically wired bus of the first inverter and a second switching element group not connected to said electrically wired bus of the second inverter, when the rotation speed of the rotating electrical machine becomes high (a control device of a rotating electrical machine according to a second aspect of the present invention).

In each typical example, the first stator winding having the lower rated voltage is connected to the second direct-current voltage source only when the rotation speed of the rotating electrical machine becomes high. Therefore, output in a high-rotation range can be ensured while preventing the second stator winding from reaching a heat-generation limit. Furthermore, such switching operations can be actualized by the first switch and the second switch. Therefore, a control device of a rotating electrical machine can be actualized by a relatively simple configuration.

DETAILED DESCRIPTION OF THE PREFERRED EMBODIMENTS

First Embodiment

A control device for a rotating electrical machine according to a first embodiment of the present invention will hereinafter be described with reference to the drawings. According to the first embodiment, the present invention is applied to a control device for a rotating electrical machine that is mounted in an electric power steering system.

Figure 1:
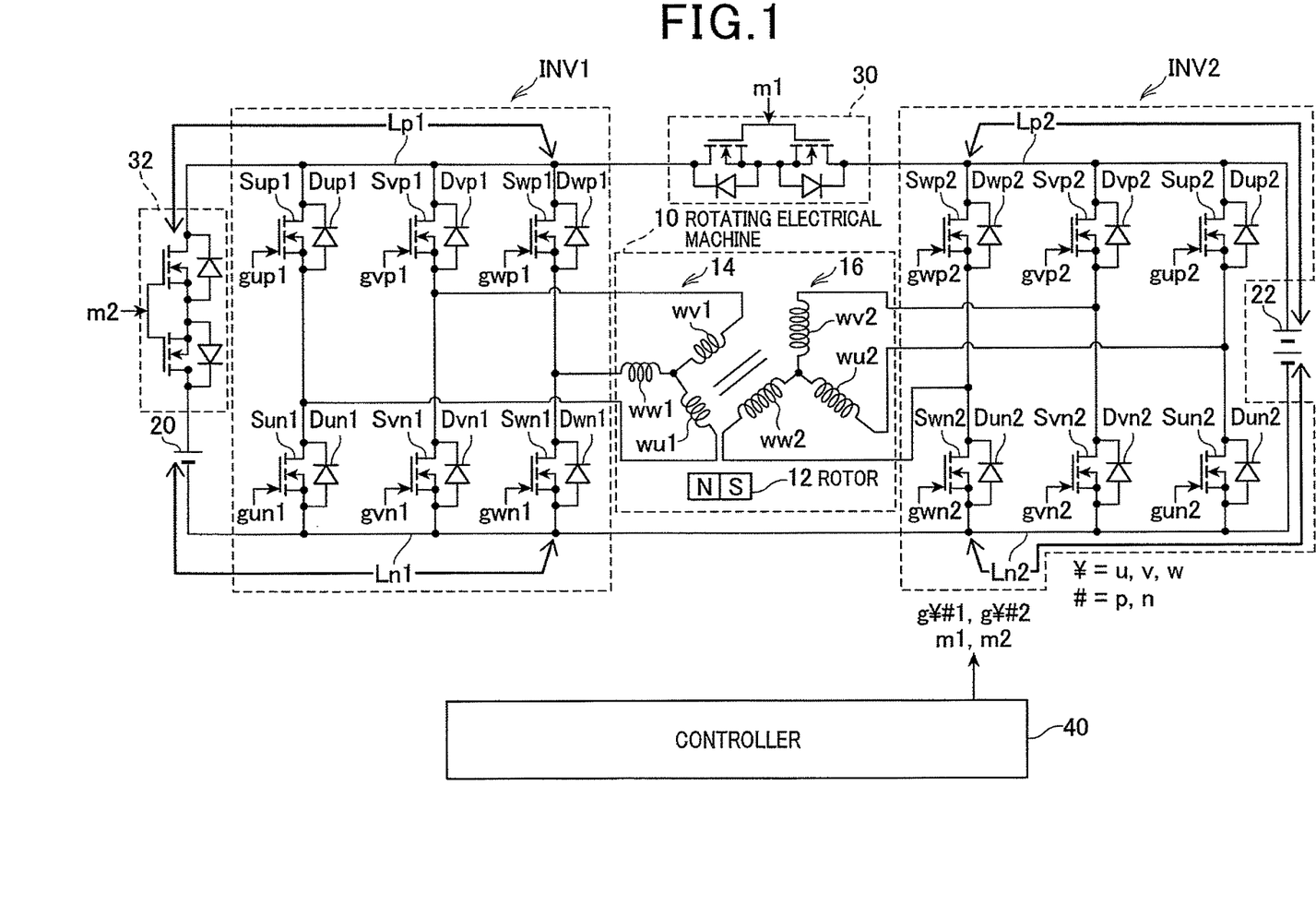
FIG. 1 is a diagram of a system configuration according to a first embodiment.

A rotating electrical machine (electric motor 10) shown in FIG. 1 is mounted in an electric power steering system. Here, the rotating electrical machine is assumed to be a permanent magnet synchronous motor. The electric motor 10 includes a rotor 12, a first stator winding 14, and a second stator winding 16. Here, the first stator winding 14 includes three stator windings, i.e. a U-phase coil wu1, a V-phase coil wv1, and a W-phase coil ww1, that are connected to one another at a neutral point. In addition, the second stator winding 16 includes three stator windings, i.e. a U-phase coil wu2, a V-phase coil wv2, and a W-phase coil ww2, that are connected to one another at a neutral point. The first stator winding 14 and the second stator winding 16 are wound around the same stator core while being insulated from each other.

In particular, according to the first embodiment, the first stator winding 14 and the second stator winding 16 are connected such that three-phase symmetry is maintained in both (such that each has a phase difference of 120 degrees). In addition, each phase of the first stator winding 14 and the corresponding phase of the second stator winding 15 are shifted by a predetermined phase. The predetermined phase is preferably an electrical angle of 30 degrees.

Here, a rated voltage (constant rating) of the second stator winding 16 is greater (by N times, N being an integer) than the rated voltage of the first stator winding 14. According to the first embodiment, this setting is actualized by the second stator winding 16 having a larger number of turns than the first stator winding 14. For example, in an instance in which the rated voltage of the first stator winding 14 is "12 volts" and the rated voltage of the second stator winding 16 is "48 volts", this setting is actualized by the number of turns of the second stator winding 16 being four times that of the first stator winding 14.

The above-described first stator winding 14 is connected to a first direct-current voltage source (first battery 20) by a first inverter INV1. The first inverter INV1 includes three sets of serially connected members composed of switching elements S¥p1 and S¥n1 (here, ¥=u, v, w; the same applies hereafter). The connection points of the serially connected members are respectively connected to the U-phase, V-phase, and W-phase of the first stator winding 14. A diode D¥#1 (¥=u, v, w; #=p, n) is connected in inverse parallel to the switching element S¥#1. According to the first embodiment, an N-channel metal-oxide-semiconductor (MOS) field-effect transistor is given as an example of the switching element S¥#1. Therefore, the diode D¥#1 may be a body diode of the switching element S¥#1.

The above-described second stator winding 16 is connected to a direct-current voltage source (second battery 22) by a second inverter INV2. The second inverter INV2 includes three sets of serially connected members composed of switching elements S¥p2 and S¥n2 (here, ¥=u, v, w). The connection points of the serially connected members are respectively connected to the U-phase, V-phase, and W-phase of the second stator winding 16. A diode D¥#2 (¥=u, v, w; #=p, n) is connected in inverse parallel to the switching element S¥#2. According to the first embodiment, an N-channel MOS field-effect transistor is given as an example of the switching element S¥#2. Therefore, the diode D¥#2 may be a body diode of the switching element S¥#2.

A terminal voltage of the above-described first battery 20 is set based on the rated voltage of the first stator winding 14. A terminal voltage of the above-described second battery 22 is set based on the rated voltage of the second stator winding 16. In other words, the terminal voltage of the above-described second battery 22 is higher than the terminal voltage of the first battery 20. In particular, according to the first embodiment, the terminal voltage of the second battery 22 is N times the terminal voltage of the first battery 20.

A negative-side direct-current bus Ln1 of the first inverter INV1 and a negative-side direct-current bus Ln2 of the second inverter INV2 are short-circuited. On the other hand, a positive-side direct-current bus Lp1 of the first inverter INV1 and a positive-side direct-current bus Lp2 of the second inverter INV2 are connected by a first switch 30. According to the first embodiment, a serially connected member composed of a pair of N-channel MOS field-effect transistors of which the respective sources are short-circuited is given as an example of the first switch 30.

The positive-side direct-current bus Lp1 of the first inverter INV1 and a positive terminal of the first battery 20 are connected by a second switch 32. According to the first embodiment, a serially connected member composed of a pair of N-channel MOS field-effect transistors of which the respective sources are short-circuited is given as an example of the second switch 32.

A controller 40 operates the first inverter INV1 and the second inverter INV2 to control the current and voltage (i.e. torque) of the electric motor 10 (first aspect of the functions of the controller 40). For example, the controller 40 uses a known vector control operation, a rectangular wave conduction control operation, or the like, thereby generating and outputting an operating signal g¥#1 of the switching element S¥#1 configuring the first inverter INV1 and generating and outputting an operating signal g¥#1 of the switching element S¥#2 configuring the second inverter INV2.

The controller 40 further opens and closes of the first switch 30 by outputting an operating signal m1 to the first switch 30. The controller 40 also opens and closes the second switch 32 by outputting an operating signal m2 to the second switch 32. In other words, according to the first embodiment, the controller 40 performs switching operation of the switch (second functional aspect of the functions of the controller 40).

Figure 2:
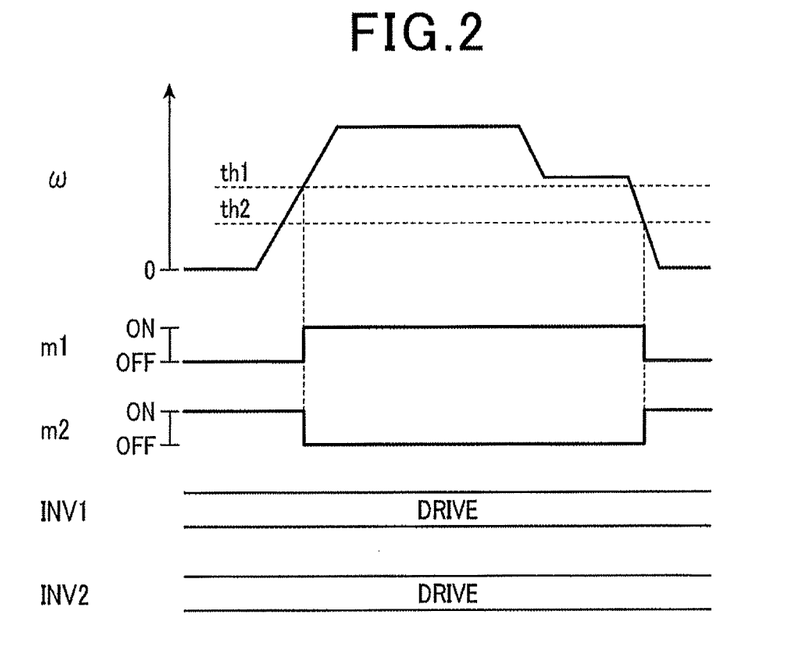
FIG. 2 is a time chart of procedures in a switching process of a controller according to the first embodiment.

FIG. 2 shows a method for opening and closing of the first switch 30 and the second switch 32 by the controller 40. As shown in FIG. 2, according to the first embodiment, as the result of a rotation speed ω of the electric motor 10 becoming a first threshold th1 or higher, the controller 40 switches the operating signal m1 for the first switch 30 to an ON operation instruction and switches the operating signal m2 for the second switch 32 to an OFF operation instruction. On the other hand, as a result of the rotation speed ω of the electric motor 10 becoming a second threshold th2 (<th1) or lower, the controller 40 switches the operating signal m1 for the first switch 30 to an OFF is operation instruction and switches the operating signal m2 for the second switch 32 to an ON operation instruction. Here, the two thresholds (the first threshold th1 and the second threshold th2) are provided to set a known hysteresis, thereby preventing the occurrence of a hunting phenomenon.

When the rotation speed ω becomes the first threshold th1 or higher, the terminal voltage of the second battery 22 is applied to the first stator winding 14. As described above, the terminal voltage of the second battery 22 is set based on the rated voltage of the second stator winding 16 that is higher than the rated voltage of the first stator winding 14. Regardless thereof, the terminal voltage of the second battery 22 is allowed to be applied to the first stator winding 14 because this instance is limited to when the electric motor 10 is rotating at a high speed. In other words, even when the constant rated voltage of the first stator winding 14 is lower than the terminal voltage of the second battery 22, the first stator winding 14 does not reach its heat-generation limit if the period over which the terminal voltage of the second battery 22 is applied is relatively short. According to the first embodiment, the process shown in FIG. 2 is performed with focus on this point.

This process enables torque to be ensured from a low range to a high range of the rotation speed ω of the electric motor 10, in coordination with the settings of the first stator winding 14 and the second stator winding 16. This will be described hereafter.

Here, the terminal voltage of the first battery 20 is voltage $V_{batt}$. The voltage induced in the first stator winding 14 is reverse voltage $E_{rev}$. The impedance of the first stator winding 14 is Z. In this instance, a current value $I_1$ flowing to the first stator winding 14 as a result of the first battery 20 being used is expressed by a following expression (c1).

$$I_1 = (V_{batt} - E_{rev})/Z \qquad (c1)$$

On the other hand, according to the first embodiment, the impedance of the second stator winding 16 is N^2 (N to the second is power) times the impedance Z of the first stator winding 14. This is because, according to the first embodiment, the rated voltage of the second stator winding 16 is N times the rated voltage of the first stator winding 14 as a result of the number of turns of the second stator winding 16 being N times the number of turns of the first stator winding 14, and the area of the housing space of the second stator winding 16 and that of the first stator winding 14 are set to be equal. In other words, the inductance of the coil is proportional to the number of turns raised to the second power. The resistance value of the coil is proportional to the length and inversely proportional to the cross-sectional area. Here, if the area of the housing space of the second stator winding 16 and that of the first stator winding 14 are set to be equal, the length of the coil of the second stator winding 16 is N times as long. Therefore, the cross-sectional area of the coil of the second stator winding 16 is 1/N times the cross-sectional area of the coil of the first stator winding 14. Thus, the resistance value is also N^2 (N to the second power) times as large.

On the other hand, the reverse voltage of the stator winding is proportional to the number of turns. Therefore, the reverse voltage of the second stator winding 16 is N times the reverse voltage $E_{rev}$ of the first stator winding 14. Thus, a current value $I_2$ flowing to the second stator winding 16 as a result of the second battery 22 being used becomes that expressed by a following expression (c2).

$$I_2 = (N \cdot Vbatt - N \cdot Erev)/N \cdot N \cdot Z \qquad (c2)$$
$$= (Vbatt - Erev)/N \cdot Z$$

As expression (c2) clearly indicates, the current value $I_2$ that can be sent to the second stator winding 16 is "1/N" times the current value $I_1$ that can be sent to the first stator winding 14. However, torque is proportional to "current×number of turns." Therefore, the torque generated in the first stator winding 14 as a result of the first battery 20 being used and the torque generated in the second stator winding 16 as a result of the second battery 22 being used become equal.

On the other hand, when the terminal voltage of the second battery 22 is applied to the first stator winding 14, a current value supplied to the first stator winding 14 is expressed by a following expression (c3).

$$I_1 = (N \cdot V_{batt} - E_{rev})/Z \qquad (c3)$$

Figure 3:
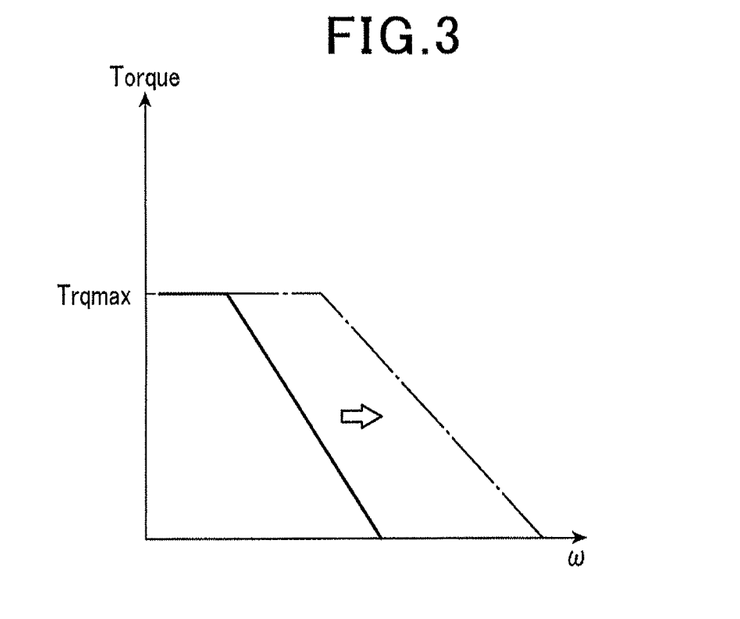
FIG. 3 is a diagram of the effects (relationship between rotational force and torque) according to the first embodiment.

Therefore, as shown in FIG. 3, a torque greater than the torque generated in the second stator winding 16 as a result of the second battery 22 being used can be generated by the first stator winding 14. In FIG. 3, the solid line indicates the torque generated in the first stator winding 14 as a result of the first battery 20 being used and the torque generated in the second stator winding 16 as a result of the second battery 22 being used. On the other hand, the dashed line indicates the torque generated in the first stator winding 14 using the second battery 22. A maximum torque $Trq_{max}$ is determined by the rated currents of the inverters INV1 and INV2, and the like.

As described above, according to the first embodiment, the maximum output of the electric motor 10 can be increased. Moreover, as a result of both inverters INV1 and INV2 being driven, the output of the electric motor 10 can be further improved. Furthermore, torque ripple in the electric motor 10 can be reduced within a range in which the torque can be generated in the second stator winding 16. This is because, as described above, a phase difference is provided between each phase of the first stator winding 14 and the corresponding phase of the second stator winding 16. In particular, when the phase difference is "30 degrees", the torque ripple reduction effect is significant.

The second switch 32 is set to an open state when the first switch 30 is set to a closed state to prevent excessively high voltage from being applied to the first battery 20.

Variation Examples According to the First Embodiment

The above-described present invention according to the first embodiment may be modified as described below.
[Method of Operating the Rotating Electrical Machine]

Figure 4:
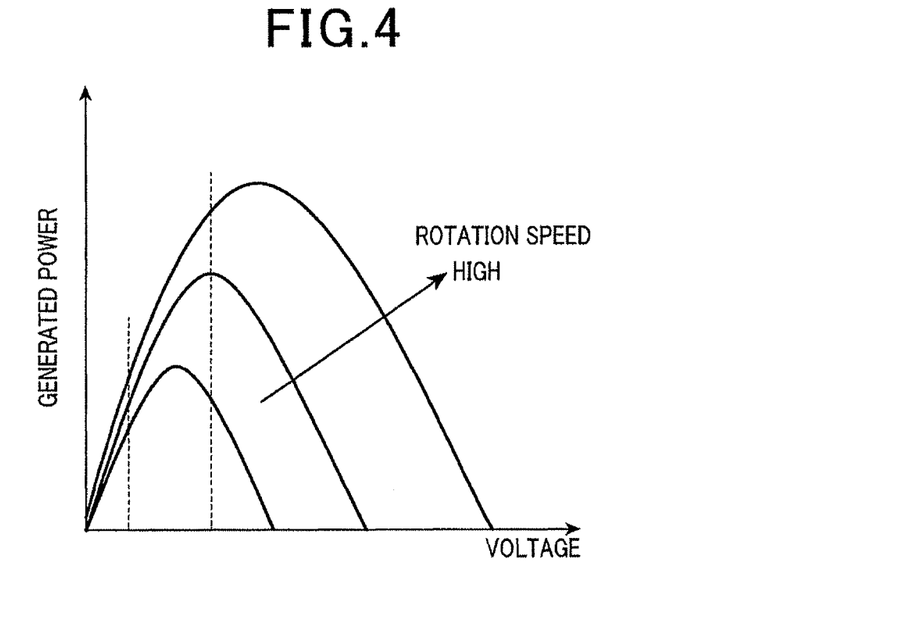
FIG. 4 is a diagram of the characteristics of voltage and generated power in an instance in which a rotating electrical machine is a power generator.
Figure 5:
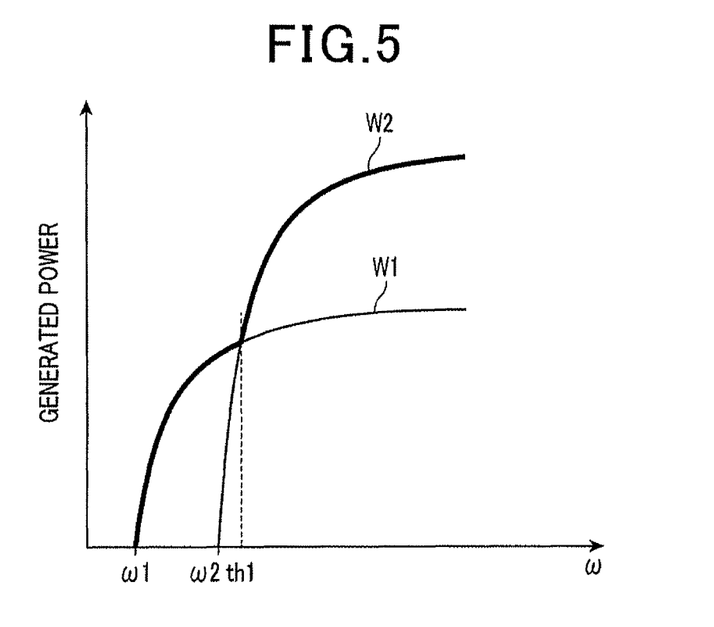
FIG. 5 is a diagram of the characteristics of rotational force and generated power in an instance in which the rotating electrical machine is a power generator.

The operating object of the rotating electrical machine is not limited to power running. The setting according to the above-described first embodiment is also particularly excellent in terms of improving power generation efficiency during a power generation (i.e. an electric power regeneration mode). In other words, in an instance in which the electric motor 10 is a synchronous generator, the generated power can be increased when the generated voltage is increased as the rotation speed increases, as shown in FIG. 4, under a condition that the generated current is the rated current or lower. Therefore, within a high-speed rotation range, the generated power can be increased, as shown in FIG. 5, as a result of the terminal voltage of the second battery 22 being applied to the first stator winding 14. In other words, when the rotation speed ω is lower than the first threshold th1, the terminal voltage of the first battery 20 is applied to the first stator winding 14. Therefore, a power-generation start rotation speed ω1 becomes lower than a power-generation start rotation speed ω2 of an instance in which the terminal voltage of the second battery 22 is constantly applied to the first stator winding 14. As a result of the rotation speed ω reaching the first threshold th1, the generated power can be increased from power W1 to power W2 by the second battery 22 being connected to the first stator winding 14.

[First Switch 30]

The first switch 30 is not limited to that which opens and closes between the positive-side direct-current bus Lp1 of the first inverter INV1 and the positive-side direct-current bus Lp2 of the second inverter INV2. For example, the first switch 30 may open and close between the negative-side direct-current bus Ln1 of the first inverter INV1 and the negative-side direct-current bus Ln2 of the second inverter INV2. Furthermore, the first switch 30 may open and close between both the positive-side direct-current bus Lp1 of the first inverter INV1 and the positive-side direct-current bus Lp2 of the second inverter INV2, and the negative-side direct-current bus Ln1 of the first inverter INV1 and the negative-side direct-current bus Ln2 of the second inverter INV2. In addition, the first switch 30 is not limited to a semiconductor relay, and may be, for example, an electromagnetic relay.

[Second Switch 32]

The second switch 32 is not limited to that which opens and closes between the positive-side direct-current bus Lp1 of the first inverter INV1 and the positive terminal of the first battery 20. For example, the second switch 32 may open and close between the negative-side direct-current bus Ln1 of the first inverter INV1 and the negative terminal of the first battery 20. In addition, the second switch 32 is not limited to a semiconductor relay, and may be, for example, an electromagnetic relay.

[Stator Winding]

The stator windings that are connected to each other are not limited to three-phase windings and may have four phases or more, such as five phases. In addition, the method of connecting each phase is not limited to a star-type connection, and may be a delta connection. In addition, the phase difference between corresponding phases of the stator windings that are connected to each other may be zero.

[Rotating Electrical Machine]

The rotating electrical machine is not limited to that mounted in an electric power steering system, that may be applicable to a rotating electrical machine as a "main driving engine" (i.e. motor generator) mounted on a hybrid car: wherein a gasoline engine is called a "supplemental driving engine" in such hybrid cars.

[Controller]

The controller is not limited to that which drives both the first inverter INV1 and the second inverter INV2. For example, the controller may stop the second inverter INV2 at the rotation speed ω at which the torque indicated by the solid line in FIG. 3, described above, becomes a specified value or lower. However, in this instance, as a result of a circulating current flowing to the diode D¥#2 of the second inverter INV2 due to the reverse voltage generated in the second stator winding 16, a load torque may be generated. Therefore, in this instance, a switch for opening and closing between the second stator winding 16 and the second inverter INV2 is preferably further included and set to an open state.

[First Inverter INV1 and Second Inverter INV2]

The switching elements S¥#1 and S¥#2 are not limited to the MOS field-effect transistors and may be, for example, insulated-gate bipolar transistors (IGBT).

Second Embodiment

Figure 6:
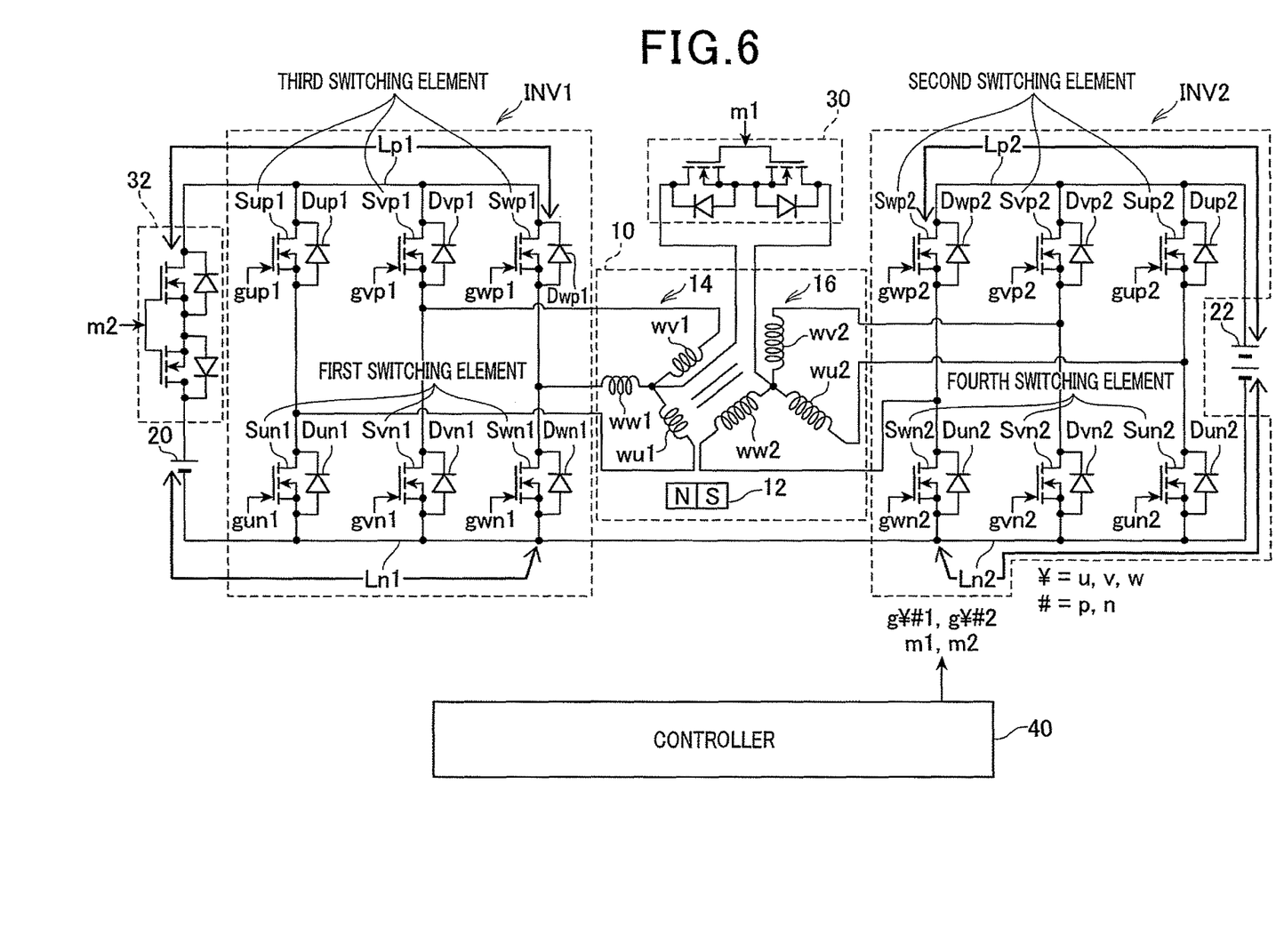
FIG. 6 is a diagram of a system configuration according to a second embodiment.

Next, the present invention according to a second embodiment will be described with reference to the drawings. FIG. 6 is a diagram of a system configuration according to the second embodiment. In the configuration in FIG. 6, components that are the same as those in FIG. 1 are given the same reference numbers.

Characteristics of the configuration according to the second embodiment are the same as those according to the first embodiment in that the negative-side direct-current bus Ln1 of the first inverter INV1 and the negative-side direct-current bus Ln2 of the second inverter INV2 are short-circuited. However, the configuration according to the second embodiment differs from that according to the first embodiment in that an electrical path connecting the positive-side direct-current bus Lp1 of the first inverter INV1 and the positive-side direct-current bus Lp2 of the second inverter INV2 is not provided.

A neutral point of the first stator winding 14 and a neutral point of the second stator winding 16 are connected by the first switch 30. According to the second embodiment, a serially connected member composed of a pair of N-channel MOS field-effect transistors of which the respective sources are short-circuited is given as an example of the first switch 30.

Here, in an instance in which the first switch 30 is set to an open state and the second switch 32 is set to a closed state, the first inverter INV1 and the second inverter INV2 are each operated by a known method. In other words, as a result of any of known switching modes 0 to 7 being separately selected for each of the first inverter INV1 and the second inverter INV2, respective output voltage vectors become the respective voltage vectors V1 to V7.

On the other hand, in an instance in which the first switch 30 is set to a closed state and the second switch 32 is set to an open state, ON and OFF operations of a switching element S¥n1 ("first switching element" in the claims) of a lower arm of the first inverter INV1 and a switching element S¥p2 ("second switching element" in the claims) of an upper arm of the second inverter INV2 are performed. At this time, a switching element S¥p1 of ("third switching element" in the claims) of an upper arm of the first inverter INV1 and a switching element S¥n2 ("fourth switching element" in the scope of claims) of a lower arm of the second inverter INV2 are fixed to the OFF state.

Eight types of operating states of the inverters INV1 and INV2 are actualized in this state. Specifically, in an instance in which the switching element S¥n1 of the lower arm of the first inverter INV1 and the switching element S¥p2 of the upper arm of the second inverter INV2 are considered to be a single inverter, operating states corresponding to the switching modes 0 to 7 can be actualized. In other words, a state in which all switching elements Sun1, Svn1, and Swn1 of the lower arm of the inverter INV1 are set to the ON state corresponds with switching mode 0. A state in which all switching elements Sup2, Svp2, and Swp2 of the upper arm of the inverter INV2 are set to the ON state corresponds with switching mode 7.

In a manner similar to that according to the first embodiment, this process enables torque to be ensured from a low range to a high range of the rotation speed ω of the electric motor 10, in coordination with the settings of the first stator winding 14 and the second stator winding 16. This will be described hereafter.

Here, the terminal voltage of the first battery 20 is voltage $V_{batt}$. The voltage induced in each phase of the first stator winding 14 is reverse voltage $E_{rev}$. The impedance of the first stator winding 14 is impedance Z. In this instance, a current value $I_{10}$ flowing to the first stator winding 14 as a result of the first battery 20 being used is expressed by a following expression (c10).

$$I_{10} = (V_{batt} - (\sqrt{3}) \cdot E_{rev})/Z \tag{c10}$$

In expression (c10), "$(\sqrt{3}) \cdot E_{rev}$" expresses an inter-line reverse voltage. "$(\sqrt{3})$" is attributed to the angle formed between lines being set to 120 degrees.

On the other hand, according to the second embodiment, the impedance of the second stator winding 16 is $N^2$ (N to the second power) times the impedance Z of the first stator winding 14. This is because, according to the second embodiment, the rated voltage of the second stator winding 16 is N times the rated voltage of the first stator winding 14 as a result of the number of turns of the second stator winding 16 being N times the number of turns of the first stator winding 14, and the area of the housing space of the second stator winding 16 and that of the first stator winding 14 are set to be equal. In other words, the inductance of the coil is proportional to the number of turns raised to the second power. The resistance value of the coil is proportional to the length and inversely proportional to the cross-sectional area. Here, if the area of the housing space of the second stator winding 16 and that of the first stator winding 14 are set to be equal, the length of the coil of the second stator winding 16 is N times as long. Therefore, the cross-sectional area of the coil of the second stator winding 16 is 1/N times the cross-sectional area of the coil of the first stator winding 14. Thus, the resistance value is also $N^2$ (N to the second power) times as large.

On the other hand, the reverse voltage of the stator winding is proportional to the number of turns. Therefore, the reverse voltage of the second stator winding 16 is N times the reverse voltage $E_{rev}$ of the first stator winding 14. Thus, a current value $I_{20}$ flowing to the second stator winding 16 as a result of the second battery 22 being used becomes that expressed by a following expression (c20).

$$I_{20} = (N \cdot Vbatt - (\sqrt{3}) \cdot N \cdot Erev)/N \cdot N \cdot Z \tag{c20}$$
$$= (Vbatt - (\sqrt{3}) \cdot Erev)/N \cdot Z$$

As is clear from expression (c20), the current value $I_{20}$ that can be sent to the second stator winding 16 is "1/N" times the current value $I_{10}$ that can be sent to the first stator winding 14. However, torque is proportional to "current×number of turns." Therefore, the torque generated in the first stator winding 14 as a result of the first battery 20 being used and the torque generated in the second stator winding 16 as a result of the second battery 22 being used become equal.

On the other hand, in the above-described instance in which the first switch 30 is set to a closed state, a current value I that can be sent to the electric motor 10 is expressed by a following expression (c30).

$$I = (N \cdot V_{batt} - \{\sqrt{(1+N+N^2)}\} \cdot E_{rev})/\{(1+N^2) \cdot Z/2\} \tag{c30}$$

Figure 8A:
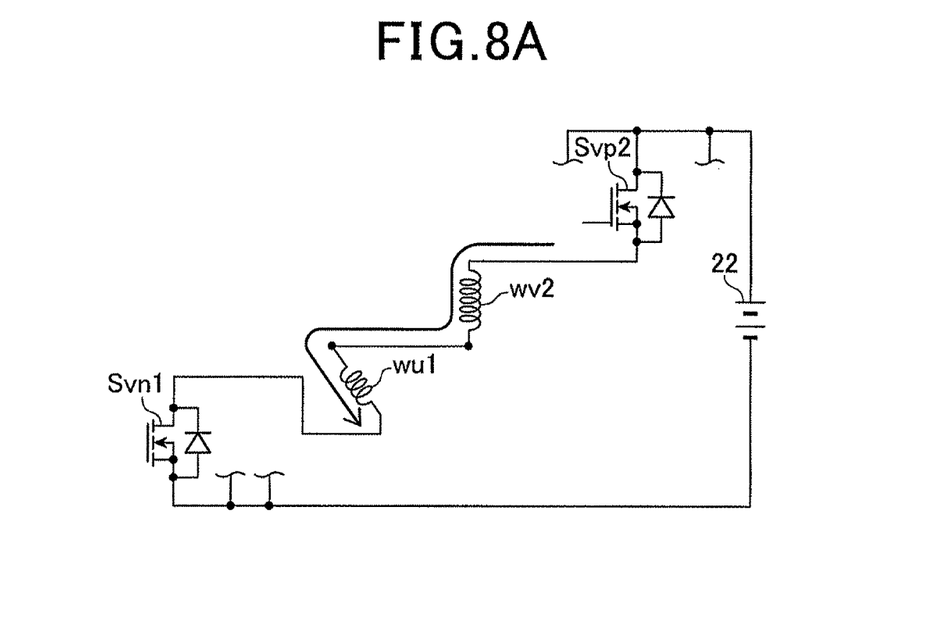
FIG. 8A and FIG. 8B are diagrams for describing the principles according to the second embodiment.
Figure 8B:
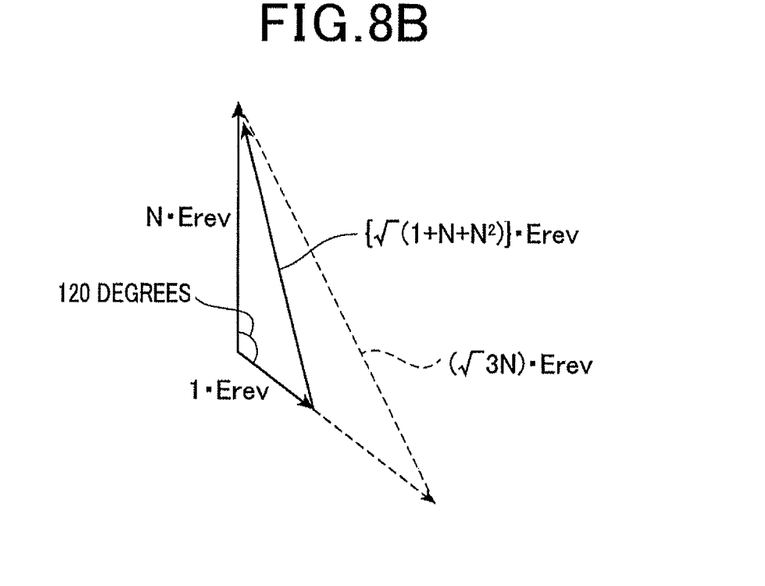

Expression (c30) makes use of the inter-line reverse voltage becoming "$\{\sqrt{(1+N+N^2)}\} \cdot E_{rev}$", as shown in FIG. 8B, as a result of the electrical path being that shown in FIG. 8A. In addition, although the impedance becomes a sum of the impedance Z of the first stator winding 14 and the impedance ($=(N^2) \cdot Z$) of the second stator winding 16, the impedance is set to "½" times thereof for consistency with above-described expression (c20).

In expression (c30), the inter-line reverse voltage and the impedance are both smaller than those indicated in above-described to expression (c20). Therefore, the current value I is greater than that indicated in expression (c20). As a result, the torque of the electric motor 10 can be increased.

In other words, in a manner similar to that shown in FIG. 3 according to the first embodiment, greater torque can be generated by the first switch 30 being set to a closed state, comparing to when the first switch 30 is set to an open state (i.e. when the first inverter INV1 and the second inverter INV2 are independently controlled). According to the second embodiment, the solid line in FIG. 3 indicates the torque generated in the first stator winding 14 as a result of the first battery 20 being used and the torque generated in the second stator winding 16 as a result of the second battery 22 being used. On the other hand, the dashed line indicates the torque generated by the first switch 30 being set to a closed state, and ON and OFF operations of the switching element S¥n1 of the lower arm of the first inverter INV1 and the switching element S¥p2 of the upper arm of the second inverter INV2 being performed. A maximum torque $Trq_{max}$ is determined by the rated currents of the inverters INV1 and INV2, and the like.

As described above, according to the second embodiment, the maximum output of the electric motor 10 can be increased by control being performed to set the first switch 30 to a closed state.

Figure 7:
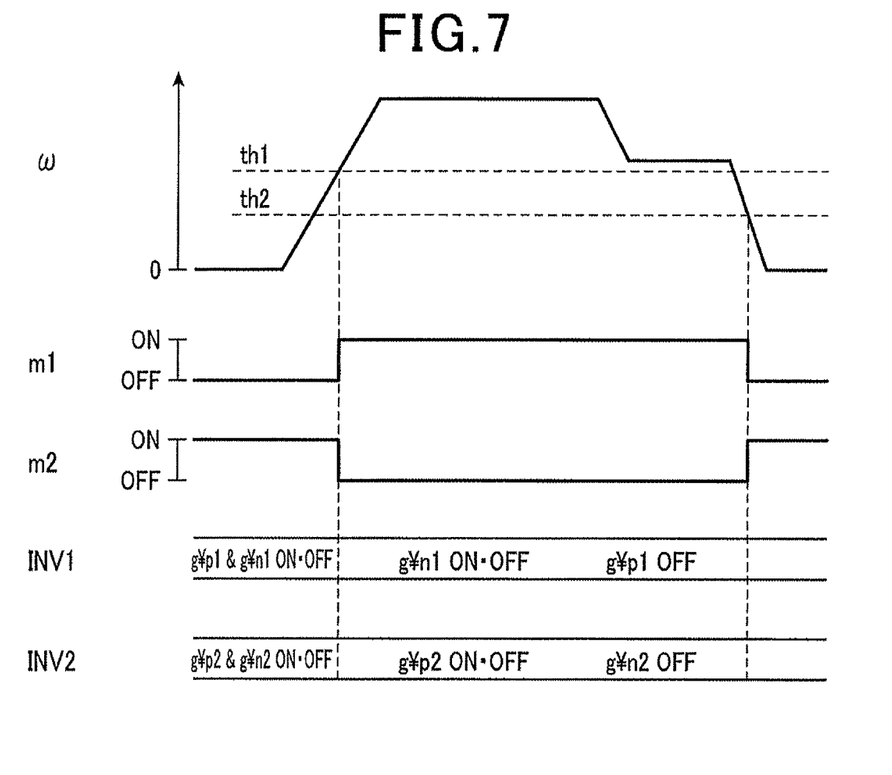
FIG. 7 is a time chart of procedures in a switching process of a controller according to the second embodiment.

When the rotation speed ω becomes the first threshold th1 or higher, a voltage higher than that of the first battery 20 is applied to the first stator winding 14. Regardless thereof, the first switch 30 is allowed to be set to the closed state because this instance is limited to when the electric motor 10 is rotating at a high speed. In other words, even when the constant rated voltage of the first stator winding 14 is near the terminal voltage of the first battery 20, the first stator winding 14 does not reach its heat-generation limit if the period over which a voltage higher than the constant rated voltage is applied is relatively short. According to the second embodiment, the process shown in FIG. 7 is performed with focus on this point.

The second switch 32 is set to an open state when the first switch 30 is set to a closed state to prevent excessively high voltage from being applied to the first battery 20.

Variation Examples According to the Second Embodiment

The above-described present invention according to the second embodiment may be modified as described below.

[Method of Operating the Rotating Electrical Machine]

The method of operating the rotating electrical machine is not limited to power running. In a manner similar to that according to the above-described first embodiment, the second embodiment is also particularly excellent in terms of improving power generation efficiency during a power generation (i.e. an electric power regeneration mode). In other words, in a synchronous generator, the generated power can be increased when the generated voltage is increased as the rotation speed increases, under a condition that the generated current is the rated current or lower. Therefore, within a high-speed rotation range, the generated power can be increased as a result of the first switch 30 being closed and the terminal voltage of the second battery 22 being applied to the electric motor 10 while increasing the current to be sent to the electric motor 10.

[First Switch (30)]

The first switch 30 is not limited to a semiconductor relay, and may be, for example, an electromagnetic relay.

[Second Switch (32)]

The second switch 32 is not limited to that which opens and closes between the positive-side direct-current bus Lp1 of the first inverter INV1 and the positive terminal of the first battery 20. For example, the second switch 32 may open and close between the negative-side direct-current bus Ln1 of the first inverter INV1 and the negative terminal of the first battery 20. In addition, the second switch 32 is not limited to a semiconductor relay, and may be, for example, an electromagnetic relay.

[Stator Winding]

The stator windings that are connected to each other are not limited to three-phase windings and may have four phases or more, such as five phases.

The setting of the axial-line directions among stator windings that are connected to each other is not limited to that given as an example according to the second embodiment.

[Rotating Electrical Machine]

The rotating electrical machine is not limited to that mounted in an electric power steering system, that may be applicable to a rotating electrical machine as a "main driving engine" (i.e. motor generator) mounted on a hybrid car: wherein a gasoline engine is called a "supplemental driving engine" in such hybrid cars.

[Controller]

As according to the second embodiment, if the second switch 32 is set to an open state when the first switch 30 is set to the closed state, the voltage of the first battery 20 is not applied to the positive-side direct-current bus Lp1 of the first inverter INV1. Therefore, the switching elements S¥p1 of the upper arm of the first inverter INV1 are not all necessarily required to be fixed to the OFF state.

In addition, for example, the operating method is changed as follows in an instance in which the positive-side direct-current bus Lp1 of the first inverter INV1 and the positive-side direct-current bus Lp2 of the second inverter INV2 are short-circuited, and the electrical path between the negative-side direct-current bus Ln1 of the first inverter INV1 and the negative-side direct-current bus Ln2 of the second inverter INV2 is eliminated. In other words, when the first switch 30 is set to a closed state, ON and OFF operations of the switching element S¥p1 of the upper arm of the first inverter INV1 and the switching element S¥n2 of the lower arm of the second inverter INV2 are performed. At this time, the switching element S¥n1 of the lower arm of the first inverter INV1 and the switching element S¥p2 of the upper arm of the second inverter INV2 are preferably fixed to the OFF state.

[First Inverter INV1 and Second Inverter INV2]

The switching elements S¥#1 and S¥#2 are not limited to the MOS field-effect transistors and may be, for example, insulated-gate bipolar transistors (IGBT).

What is claimed is:

1. A control device of a rotating electrical machine, wherein the control device is provided with a first stator winding and a second stator winding that has a greater rated voltage than the first stator winding, the first stator winding and the second stator winding being insulated from each other, comprising:
a first inverter that is connected to the first stator winding;
a second inverter that is connected to the second stator winding;
a controller that operates the first inverter and the second inverter to control a current and voltage of the rotating electrical machine;
a first switch for switching a first state and a second state, wherein the first state is a state that the first inverter and the second inverter is electrically connected to a second direct voltage source, and the second state is a state that only the second inverter is electrically connected to the second direct voltage source; and
a second switch for connecting or disconnecting the first inverter to and from a first direct-current voltage source whose terminal voltage is lower than that of the second direct-current voltage source;
wherein
the controller performs i) an operation to switch the first switch to an open state and switch the second switch to a closed state when a rotation speed of the rotating electrical machine is low, and ii) an operation to switch the first switch to a closed state and the second switch to an open state when the rotation speed of the rotating electrical machine becomes high.

2. The control device of a rotating electrical machine according to claim 1, wherein
the first switch is provided in either position between a positive-side direct-current bus of the first inverter and a a positive-side direct-current bus of the second inverter or between a negative-side direct-current bus of the first inverter and a negative-side direct-current bus of the second inverter, and
the second switch is provided in a position between the first inverter and the first direct current voltage source.

3. The control device of a rotating electrical machine according to claim 2, wherein
when a state is reached in which the first switch is set to the open state and the second switch is set to the closed state, the controller operates switching elements which is main elements of both the first inverter and the second inverter such that an alternating voltage based on the first direct-current voltage source is applied to the first stator winding from the first inverter and an alternating voltage based on the second direct-current voltage source is applied to the is second stator winding from the second inverter.

4. A control device of a rotating electrical machine, wherein the control device is provided with a first stator winding in which a plurality of coils are connected and a second stator winding in which a plurality of coils are connected and that has a greater rated voltage than the first stator winding, comprising:
a first inverter that is connected to the first stator winding;
a second inverter that is connected to the second stator winding;
a controller that operates the first inverter and the second inverter to control a current and voltage of the rotating electrical machine; and
a first switch that opens and closes between a neutral point of the first stator winding and a neutral point of the second stator winding; wherein
the first stator winding and the second stator winding are insulated from each other and housed within the rotating electrical machine,
an electrically wired connection is made either between a positive-side direct-current bus of the first inverter and a positive-side direct-current bus of the second inverter, or between a negative-side direct-current bus of the first inverter and a negative-side direct-current bus of the second inverter, and the controller i) sets the first switch to an open state, applies an alternating voltage based on a voltage of a first direct-current voltage source to the first stator winding from the first inverter and applies an alternating voltage based on a voltage of a second direct-current voltage source to the second stator winding 16 from the second inverter when a rotation speed of the rotating electrical machine is low, and ii) switches the switch to a closed state, and performs ON and OFF operation of a first switching element group connected to said electrically wired bus of the first inverter and a second switching element group not connected to said electrically wired bus of the second inverter, when the rotation speed of the rotating electrical machine becomes high.

5. The control device of a rotating electrical motor according to claim 4, the control device further including
a second switch for connecting or disconnecting the first inverter to and from a first direct voltage source, wherein
the controller sets the second switch to a closed state when the first switch is set to an open state, and sets the second switch to an open state when the first switch is set to a closed state.

6. The control device of a rotating electrical machine according to claim 4, wherein
the controller keeps both a third switching element group not connected to said electrically wired bus of the first inverter and a fourth switching element group connected to said electrically wired bus of the second inverter to an OFF state, during a period in which the first switch is set to a closed state.

7. The control device of a rotating electrical machine according to claim 1, wherein the control device is applied to any of a rotating electrical machine for electric power steering of a vehicle or for a main driving engine mounted on a hybrid car.

8. The control device of a rotating electrical machine according to claim 4, wherein the control device is applied to any of a rotating electrical machine for electric power steering of a vehicle or for a main driving engine mounted on a hybrid car.

* * * * *